(12) United States Patent  
Chen

(10) Patent No.: US 8,515,475 B2
(45) Date of Patent: Aug. 20, 2013

(54) APPARATUSES AND METHODS FOR HANDLING NETWORK INITIATED CONNECTION RELEASE PROCEDURES

(75) Inventor: Te-Ming Chen, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 175 days.

(21) Appl. No.: 13/049,306

(22) Filed: Mar. 16, 2011

(65) Prior Publication Data

US 2011/0230220 A1 Sep. 22, 2011

Related U.S. Application Data

(60) Provisional application No. 61/314,697, filed on Mar. 17, 2010.

(51) Int. Cl.
*H04B 7/00* (2006.01)

(52) U.S. Cl.
USPC ........ 455/509; 455/3.01; 455/3.02; 455/3.03; 455/515; 455/516; 725/62; 725/63; 725/73

(58) Field of Classification Search
USPC ... 455/3.01–3.06, 509, 515, 516; 725/62–63, 725/73
See application file for complete search history.

(56) References Cited

U.S. PATENT DOCUMENTS

| 2007/0213080 | A1 | 9/2007 | Kuo |  |
|---|---|---|---|---|
| 2008/0253312 | A1* | 10/2008 | Park | 370/311 |
| 2009/0247176 | A1* | 10/2009 | Song et al. | 455/450 |
| 2011/0230220 | A1* | 9/2011 | Chen | 455/507 |

FOREIGN PATENT DOCUMENTS

| EP | 1821563 A2 | 8/2007 |
|---|---|---|
| JP | 2006-516080 A | 6/2006 |
| KR | 10-2007-0083093 A | 8/2007 |

OTHER PUBLICATIONS

3GPP TS 25.346 V9.0.0, 3rd Generation Partnership Project; Technical Specification Group Radio Access Network; Introduction of the Multimedia Broadcast Multicast Service (MBMS) in the Radio Access Network (RAN); Stage 2 (Release 9), (Dec. 2009), pp. 1-71.
3GPP TSG-RAN2 Meeting #46-bis, Samsung, "MBMS scenario's related to service prioritisation," Beijing, P.R. China, Apr. 4-8, 2005, 3 pages total, Published on: Mar. 2005), R2-050827.
ETSI TS 136 331 v9.1.0 (Feb. 2010); LTE; Evolved Universal Terrestrial Radio Access (E-UTRA); Radio Resource Control (RRC); Protocol specification (3GPP TS 36.331 version 9.1.0 Release 9); pp. 1-234.

* cited by examiner

*Primary Examiner* — Fayyaz Alam
(74) *Attorney, Agent, or Firm* — Birch, Stewart, Kolasch & Birch, LLP

(57) ABSTRACT

A mobile communications device with a wireless module and a controller module is provided. The wireless module receives a connection release message for leaving a connected mode from a wireless network. The controller module in response to the connection release message, keeps radio resources of a multimedia broadcast and multicast services (MBMS) service unreleased and releases all radio resources other than the MBMS service. Thereafter, the controller module enters an idle mode.

12 Claims, 5 Drawing Sheets

APPARATUSES AND METHODS FOR HANDLING NETWORK INITIATED CONNECTION RELEASE PROCEDURES

CROSS REFERENCE TO RELATED APPLICATIONS

This application claims priority of U.S. Provisional Application No. 61/314,697, filed on Mar. 17, 2010, and the entirety of which is incorporated by reference herein.

BACKGROUND OF THE INVENTION

1. Field of the Invention

The invention generally relates to handling connection release procedures, and more particularly, to apparatuses and methods for handling a network initiated connection release procedure for users receiving multimedia broadcast and multicast services (MBMS) services.

2. Description of the Related Art

In a typical mobile communication environment, a user equipment (UE) may communicate voice and/or data signals with one or more service networks via cellular stations of the service networks. The wireless communications between the HE and the service networks may be in compliance with various wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, and others. The Radio Resource Control (RRC) state of the User Equipment (UE) can be either an idle mode (RRC_IDLE) or a connected mode (RRC_CONNECTED). When an RRC connection is established, the UE leaves the idle mode and enters the connected mode, and when a RRC connection is released the UE leaves the connected mode and enters the idle mode. In other words, a UE is in a connected mode when an RRC connection has been established and the UE is in an idle mode if no RRC connection is established.

A UE in the idle mode may further perform cell selection and reselection to decide which cell to camp on. The cell (re)selection process takes into account the priority of each applicable frequency of each applicable Radio Access Technology (RAT), the radio link quality and the cell status (i.e. whether a cell is barred or reserved). A UE in the idle mode may further monitor a paging channel to detect incoming calls, and also acquires system information. The system information mainly consists of parameters by which the network can control the cell (re)selection process.

Take the LTE technology for example. After a UE is powered on, it will need to perform a connection establishment procedure to connect to the LTE network so that it can obtain packet data services from the LTE network. The purpose of the connection establishment procedure is to establish a (RRC) connection. As shown in FIG. 1, the connection establishment procedure starts by the UE transmitting a CONNECTION REQUEST message to the LTE network to request the establishment of an RRC connection (step S110). When receiving the CONNECTION REQUEST message, the LTE network checks if the establishment cause and loading of the network, e.g. the load of eNB, matched. If none of the checks fail, the LTE network accepts the connection request by transmitting a CONNECTION SETUP message to the UE (step S130). In response to the CONNECTION SETUP message, the UE establishes the logical links and bearers according to the configuration information (step S140), and transmits a CONNECTION SETUP COMPLETE message to the LTE network (step S150), to acknowledge that it has received the CONNECTION SETUP message and confirm the successful completion of the RRC connection establishment. If the CONNECTION SETUP COMPLETE message is received successfully, the connection establishment procedure ends. Later, a connection release procedure may be initiated to release the established connection from the LTE network.

No matter the UE is in connected mode or idle mode, a UE that interests in MBMS service will base on MBSENArea-Configuration message to configure MBMS radio resources. Specially, the UE may first receive system information to get the MCCH configuration, obtain the MBSFNAreaConfiguration message on MCCH, and then obtain MBMS radio resources configurations, i.e. MTCH information from this message.

FIG. 2 is a message sequence chart illustrating a connection release procedure initiated by a LTE network. The connection release procedure may be initiated by a LTE network for various reasons, such as due to a completion of transaction between the user equipment and the core network, an unspecified failure, user inactivity, loss of radio connection with UE and the like. To begin, the LTE network first transmits a CONNECTION RELEASE message to the UE to request the UE to release the RRC connection from the LTE network (step S210). When receiving the CONNECTION RELEASE message, the UE releases the established logical links and bearers for the packet data services (step S220).

The connection release procedure is used to release an established connection, which includes the release of established radio bearers as well as all radio resources. In other words, the UE will release all the radio resources when leaving the connected mode.

BRIEF SUMMARY OF THE INVENTION

Accordingly, embodiments of the invention provide apparatuses and methods for handling a network initiated connection release procedure. In one aspect of the invention, a mobile communications device with a wireless module and a controller module is provided. The wireless module receives a connection release message for leaving a connected mode from a wireless network. The controller module in response to the connection release message, keeps radio resources of a multimedia broadcast and multicast services (MBMS) service unreleased and releases all radio resources other than the MEMS service. Thereafter, the controller module enters an idle mode.

In another aspect of the invention, a method for handling a network initiated connection release procedure by a mobile communications device of a wireless network is provided. The method comprises the steps of receiving a connection release message for leaving a connected mode from a wireless network, keeping radio resources of a multimedia broadcast and multicast services (MBMS) service unreleased and releasing all radio resources other than the MBMS service in response to the connection release message, and entering an idle mode.

Other aspects and features of the present invention will become apparent to those with ordinarily skill in the art upon review of the following descriptions of specific embodiments of apparatuses and methods for handling a network initiated detachment procedure.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
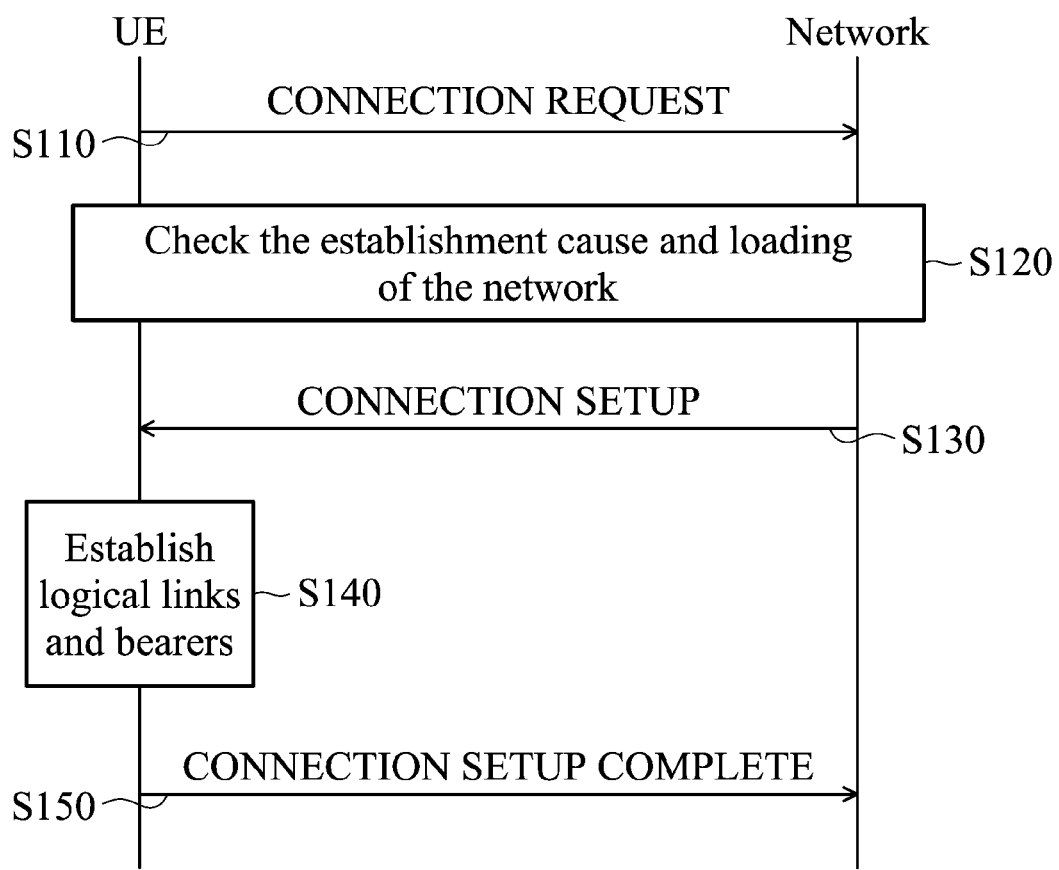
FIG. 1 is a message sequence chart illustrating a connection establishment procedure performed for access to a LTE network by a UE.
Figure 2:
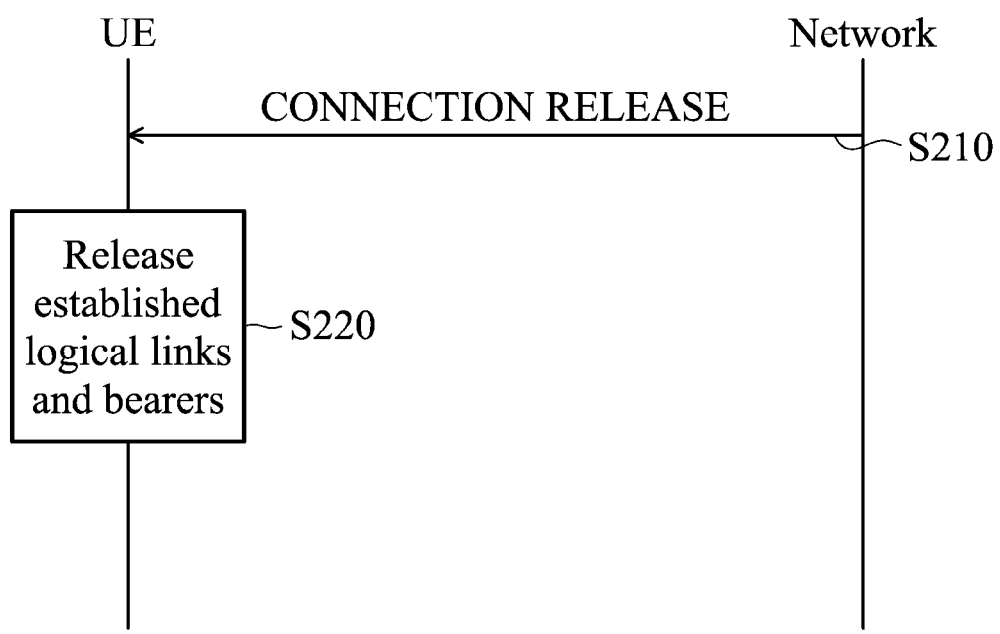
FIG. 2 is a message sequence chart illustrating a connection release procedure initiated by a LTE network.

The following description is of the best-contemplated mode of carrying out the invention. This description is made for the purpose of illustrating the general principles of the invention and should not be taken in a limiting sense. The 3GPP specifications are used to teach the spirit of the invention, and the invention is not limited thereto.

A WCDMA network or an LTE network may comprise femtocells which are commonly designed for residential or small business environments, and can provide wireless coverage to UEs using the WCDMA technology or LTE technology to communicate with the UEs and an existing broadband Internet connection (e.g., digital subscriber line (DSL), cable, etc.) for backhaul. A multimedia broadcast multicast service (MBMS) service has been introduced to the LTE specification so that TV, film, information such as free overnight transmission of newspaper in digital form and other media may be broadcast or multicast in the networks. MEMS is a point to multipoint service for data transmission from a data source to multiple users. The MBMS can implement sharing of resources of networks (including a core network and an access network), and can provide a service to as many as possible multimedia users having a same demand, while using minimal resources. An MBMS PTM radio bearer configuration procedure may be used by the UE that is interested to receive one or more MBMS services to configure radio resources, for example, RLC, MAC and the physical layer upon starting and or stopping to receive an MRB. The UE may apply an MRB establishment procedure to start receiving a session of a service it has an interest in and apply an MRB release procedure to stop receiving a session. The MRB release procedure may be initiated, for example, upon stop of the MBMS session, upon leaving a corresponding MBSFN service area, upon losing interest in the MBMS service, or when capability limitations start inhibiting reception of the concerned service.

Note that during the conventional connection release procedure described above, the UE will release all the radio resources when leaving the connected mode. In general, the UE may obtain MBMS services in both the connected mode (i.e. RRC_CONNECTED) and the idle mode (i.e. RRC_IDLE). If a UE that obtained MBMS services in the connected mode, would like to obtain the same MBMS service when it enters the idle mode, it may need to release the MBMS radio resources and re-setup the same MBMS resources again. In this case, the UE to be unable to obtain normal packet data services and there may be any extra delay, thus, impairing user experience. For example, when a user is watching a 2 hour long movie in the idle mode and the periodic tracking area update timer has expired, the UE needs to enter a connected mode and perform a tracking area update procedure which is a procedure that the UE updates the network as to its new location whenever it moves out of its current tracking area. After the tracking area update procedure, the UE will return back to the idle mode again. Since the default value of the periodic tracking area update timer is about 58 minutes, the movie may be interrupted at least 2 or 3 times. In order to solve this problem, the invention provides an improved connection release procedure for the UE receiving MBMS services to keep the MBMS services activated while the UE leaves the connected mode.

Figure 3:
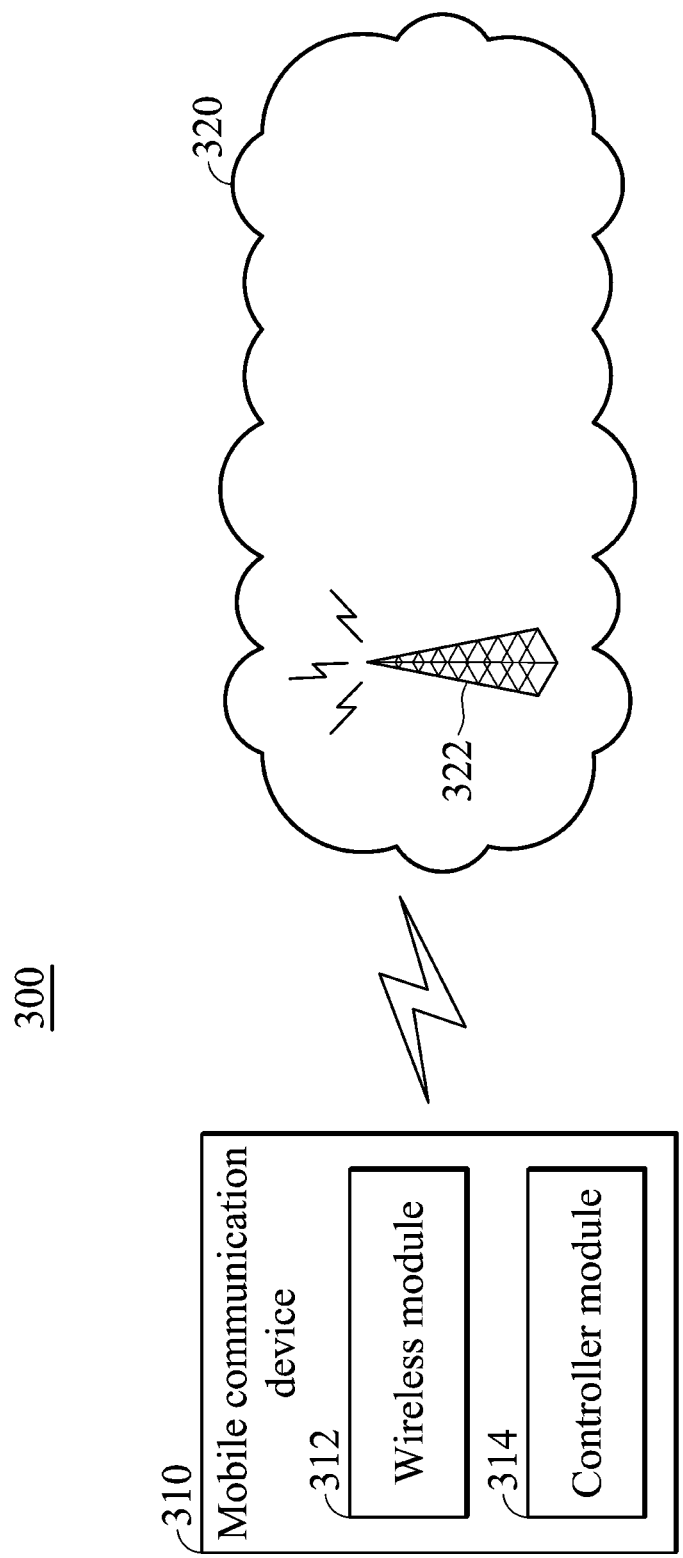
FIG. 3 is a block diagram illustrating a mobile communication environment according to an embodiment of the invention.

FIG. 3 is a block diagram illustrating a mobile communication environment according to an embodiment of the invention. In the mobile communications environment 300, the mobile communications device 310 is wirelessly connected to the cellular station 322 of the service network 320 for obtaining wireless services. Generally, the cellular station 322 may be referred to as a base station or an access station. The mobile communication device 310 comprises a wireless module 312 for performing the functionality of wireless transmissions and receptions to and from the cellular station 322. To further clarify, the wireless module 312 may comprise a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 900 MHz, 1900 MHz, or 2100 MHz utilized in WCDMA systems, or may be 900 MHz, 2100 MHz, or 2.6 GHz utilized in LTE systems, or others depending on the radio access technology (RAT) in use. Also, the mobile communication device 310 further comprises a controller module 314 for controlling the operation of the wireless module 312 and other functional components, such as a display unit and/or keypad serving as the MMI (man-machine interface), a storage unit storing the program codes of applications or communication protocols, or others. In one embodiment, the service network 320 may be a WCDMA network and the mobile communications device 310 may be a UE in compliance with the 24.008 specification and other related specifications of the WCDMA technology; while in another embodiment, the service network 320 may be an LTE network and the mobile communications device 310 may be a UE in compliance with the 3GPP TS 24.301 specification and other related specifications of the LTE technology. Alternatively, the mobile communications device 310 may be a UE in compliance with both of the specifications of the WCDMA and LTE communication protocols, and the invention is not limited thereto.

To be more specific, the controller module 314 controls the wireless module 312 for performing a connection release procedure with the service network 320 via the cellular station 322.

Figure 4:
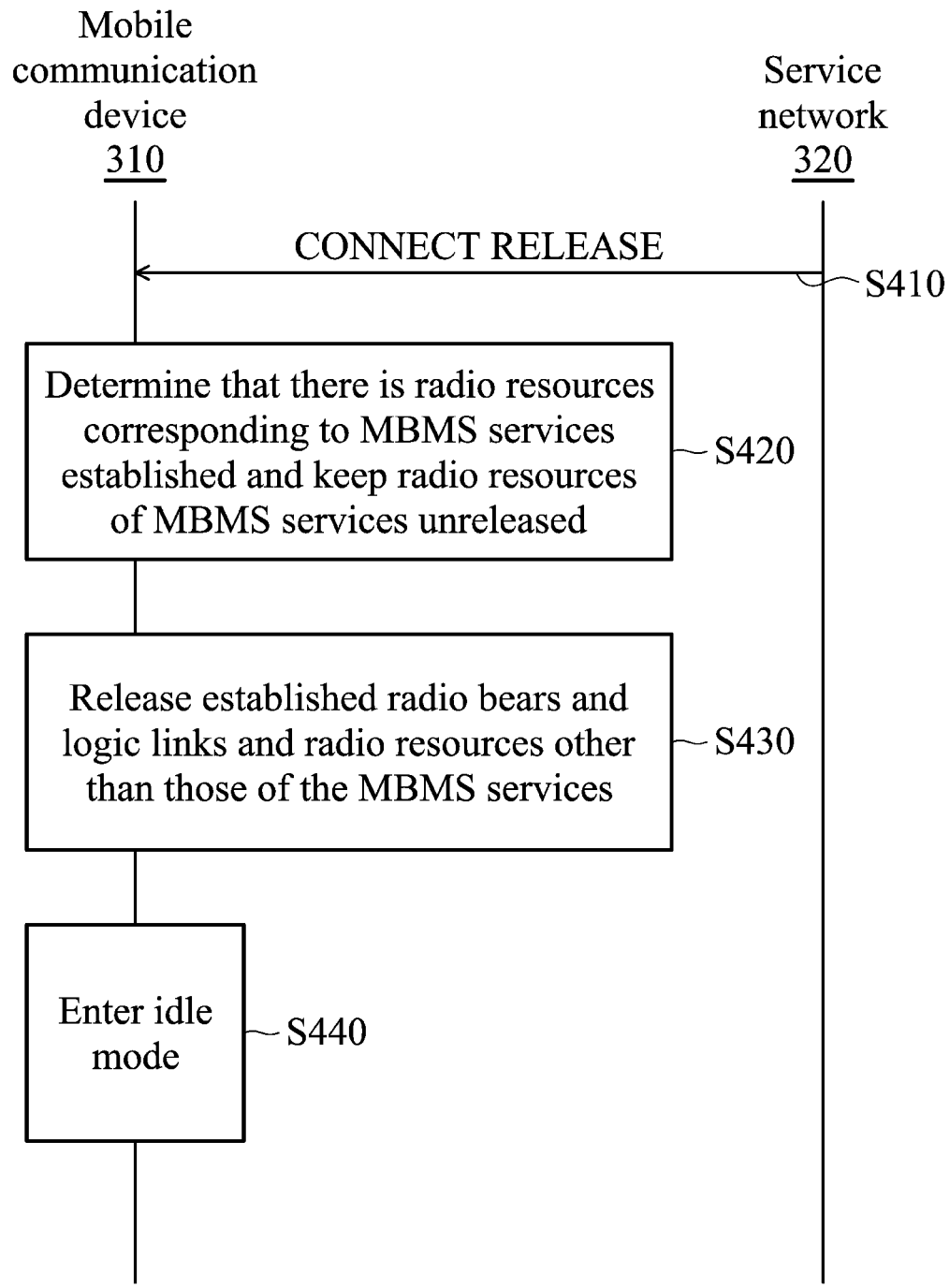
FIG. 4 is a message sequence chart illustrating a connection release procedure according to an embodiment of the invention.

FIG. 4 is a message sequence chart illustrating a connection release procedure according to an embodiment of the invention. As shown in FIG. 4, the connection release procedure is started by receiving a connection release request message which may comprise a cause of the release from the cellular station 322 (step S410). Next, the controller module 314 determines whether any radio resources corresponding to MBMS services have been established, i.e. if any MBMS service is undergoing. Note that, before the connection release procedure, the controller module 314 may have received system information, such as SIB (System Information Block)-1 and SIB-3 of a WCDMA network or SIB-1 of an LTE network, from the cellular station 322 via the wireless module 312. In this embodiment, it is determined that at least one radio resource corresponding to MBMS services have been established (step S420), so the controller module 314 keeps the radio resources of the MBMS services unreleased and releases all other established radio resources other than those of the MBMS service (step S430). In response to determining that at least one radio resource corresponding to an MBMS service has been established, in addition to keeping the radio resources of the MBMS services unreleased (step S420), the controller module 314 proceeds with a normal connection release procedure to complete the release of the connection. That is, the controller module 314 performs a resource release procedure to release established PDP contexts and logical links except for MBMS contexts. Releasing of the established radio resources may include release of the RLC entity, the MAC configuration and the associated PDCP entity for all established radio bearers. In addition to release of all established radio resources, to complete the connection release procedure, the mobile communications device may further, for example, reset the MAC, stop all timers that are running except for a specific timer, e.g. a timer T320, indicate the release of the RRC connection to the upper layers together with the cause of the release as specified in the 3GPP TS 36.331. After the resource release procedure is finished, the controller module 314 enters the idle mode (S440) and the connection release procedure ends. Note that the released PDP contexts and logical links were previously established during a connection establishment procedure prior to the connection release procedure. After being powered on, the mobile communications device 310 performs the connection establishment procedure to connect to the service network 320 and establish PDP contexts, MBMS contexts, and logical links, so that it can obtain related packet data services from the service network 320.

Figure 5:
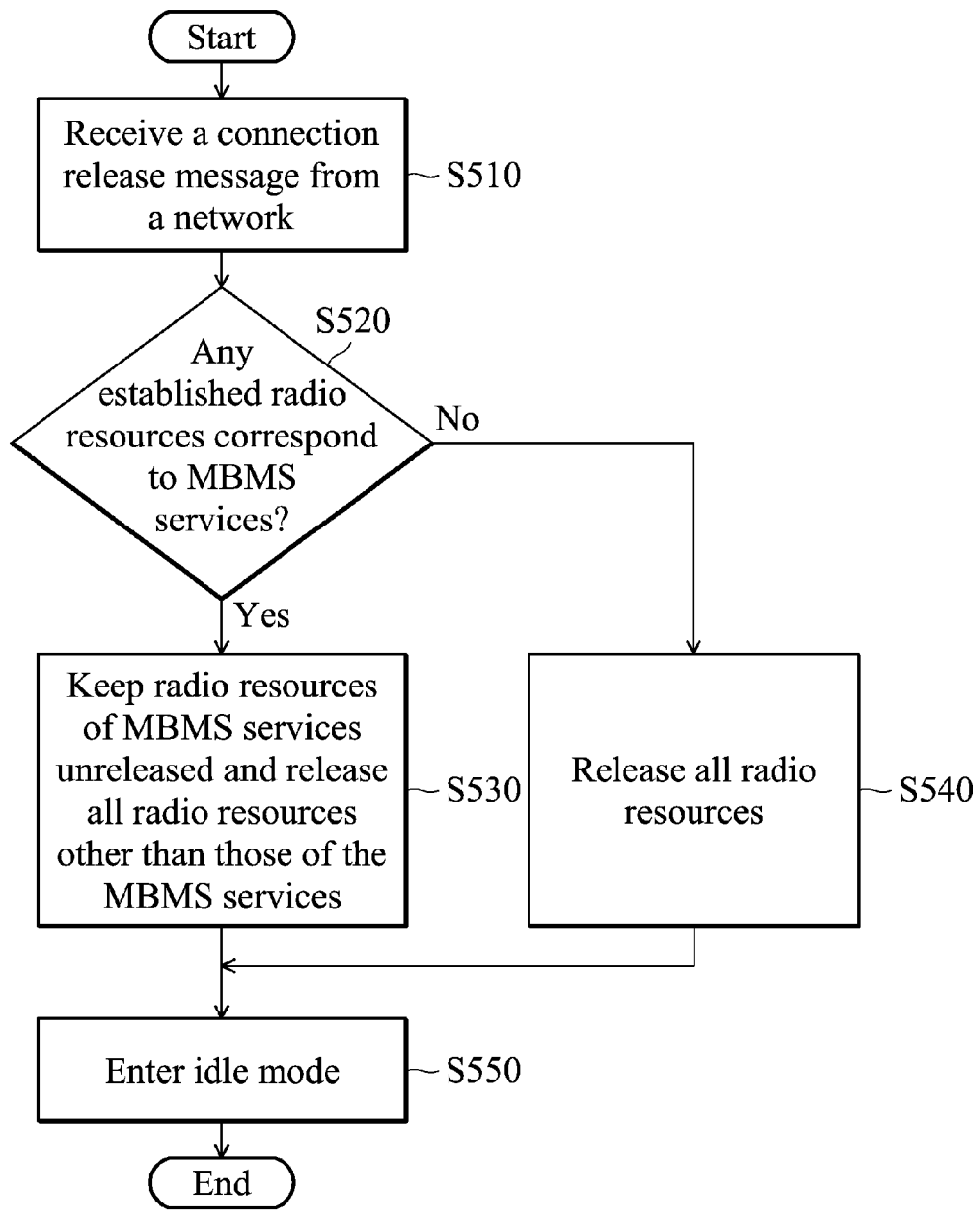
FIG. 5 is a flow chart illustrating a method for handling a network initiated connection release procedure by a mobile communications device according to an embodiment of the invention.

FIG. 5 is a flow chart illustrating a method for handling a network initiated connection release procedure by a mobile communications device according to an embodiment of the invention. In this embodiment, the mobile communications device is wirelessly connected to a cellular station of the service network which initiates the connection release procedure. The service network may initiate the connection release procedure for various reasons, such as due to a completion of transaction between the user equipment and the core network, an unspecified failure, user inactivity, loss of radio connection with UE and the like.

First, the mobile communications device receives a connection release message from the cellular station (step S510). In response to the connection release message, the mobile communications device may prepare to perform a connection release procedure. Next, when performing the connection release procedure, the mobile communications device determines whether any radio resources corresponding to MBMS services have been established (step S520). If so, it means that the mobile communication device is currently receiving at least one MBMS service, thus, the mobile communications device keeps the radio resources of the MBMS services unreleased and releases all other established radio resources other than those of the MBMS service (step S530) and step S550 is further performed. If it is determined that no radio resources corresponding to MBMS services have been established (no in step S520), it means that no MBMS service is undergoing in the mobile communications device. Accordingly, the mobile communications device releases all established radio resources (step S540) and step S550 is further performed. Note that, the release of all established radio resources may include release of the RLC entity, the MAC configuration and the associated PDCP entity for all established radio bearers. In addition to the release of all established radio resources, to complete the connection release procedure, the mobile communications device may further reset the MAC, stop all timers that are running except a specific timer, indicate the release of the RRC connection to the upper layers together with the cause of the release as specified in the 3GPP TS 36.331. After all of the aforementioned operations have been done, in step S550, the mobile communications device then enters into the idle mode, and the connection release procedure ends. After the idle mode is entered into, as the radio resources of the MBMS services have not been released, the mobile communications device may obtain the same MBMS services. Thus, re-setup of the radio resources of the MBMBS service is not necessary.

Note that, before the connection release procedure, the mobile communication device may have received system information from the cellular station, which indicated which cells provided which of the MBMS service. When leaving the connected mode, the mobile communication device may camp on suitable cells and perform required idle mode tasks. On transition from the connected mode to the idle mode, the mobile communications device should normally attempt to select the cell to which it was connected, such as to attempt to camp on the last cell for which it was in the connected mode or a cell/any cell of set of cells or any cell of frequency assigned by RRC in the state transition message. The mobile communications device may select, for example, its last connected cell to camp on or select the cells that provided the same MBMS service to camp on. Note that, the mobile communications device may recognize which cells provided the same MBMS service from previous measurement results. In another embodiment, the mobile communications device may recognize which cells provided the same MBMS service by information regarding which cells were previously visited. In another embodiment, the service network may redirect the mobile communications device to the cells that provided the same MBMS service by a RRC connection release message. In another embodiment, the mobile communications device may recognize which cells provided the same MBMS service by a specific message received from the service network. The specific message may be, for example, system information, RRC connection reconfiguration message, an RRC release message or MBMS dedicated messages (e.g. an MBSFNAreaConfiguration message), but it is not limited thereto.

It is to be noted that, if no suitable cell is found, the mobile communications device may further perform a cell selection starting with stored information cell selection procedure in order to find a suitable cell to camp on. In some embodiments, the connection release message may also include information directing the mobile communications device to search for a cell on a particular frequency. In this case, the mobile communications device performs normal idle mode operations, that is, monitoring paging, acquiring system information and performing cell reselection.

The method may be implemented in program code stored in a machine-readable storage medium, such as a magnetic tape, semiconductor, magnetic disk, optical disc (e.g., CD-ROM, DVD-ROM, etc.), or others, and when loaded and executed by a processing unit, a micro-control unit (MCU), or the controller module 314 in FIG. 3, the program code may perform the method for handling a network initiated connection release procedure. In addition, the method may be applied to any mobile communications device supporting the WCDMA technology and/or the LTE technology.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A mobile communications device, comprising:
   a wireless module receiving a connection release message for leaving a connected mode from a wireless network; and
   a controller module, in response to the connection release message, keeping radio resources of a multimedia broadcast and multicast services (MBMS) service unreleased, releasing all radio resources other than the MBMS service and entering an idle mode,
   wherein the mobile communications device continues the MBMS service without re-setuping the radio resources of the MBMS service when entering the idle mode from the connected mode.

2. The mobile communications device of claim 1, wherein the controller module further obtains the MBMS service after leaving the connected mode.

3. The mobile communications device of claim 2, wherein the controller module further selects a cell that provides the MBMS service after leaving the connected mode according to a specific message from the wireless network.

4. The mobile communications device of claim 3, wherein the specific message comprises system information, an RRC connection reconfiguration message, the connection release message, or a MBMS dedicated message.

5. The mobile communications device of claim 4, wherein the MBMS dedicated message is an MBSFNAreaConfiguration message.

6. The mobile communications device of claim 1, wherein the controller module further selects a cell that it was last connected to after leaving the connected mode.

7. A method for handling a network initiated connection release procedure by a mobile communications device of a wireless network, comprising:
   receiving a connection release message for leaving a connected mode from a wireless network;
   in response to the connection release message, keeping radio resources of a multimedia broadcast and multicast services (MBMS) service unreleased and releasing all radio resources other than MBMS service; and
   entering an idle mode,
   wherein the mobile communications device continues the MBMS service without re-setuping the radio resources of the MBMS service when entering the idle mode from the connected mode.

8. The method of claim 7, further comprising obtaining the MBMS service after leaving the idle mode.

9. The method of claim 8, further comprising selects a cell that provides the MBMS service according to a specific message from the wireless network.

10. The method of claim 9, wherein the specific message comprises system information, an RRC connection reconfiguration message, the connection release message, or a MBMS dedicated message.

11. The method of claim 10, wherein the MBMS dedicated message is an MBSFNAreaConfiguration message.

12. The method of claim 7, further comprising selects a cell that it was last connected to after leaving the connected mode.

* * * * *